United States Patent
Lee et al.

(10) Patent No.: US 9,524,533 B2
(45) Date of Patent: Dec. 20, 2016

(54) METHODS AND SYSTEMS ON CHIP FOR UPDATING FRAMES BASED ON AN INDICATION SIGNAL FOR A DISPLAY SYSTEM

(71) Applicant: Samsung Electronics Co., Ltd., Suwon-si (KR)

(72) Inventors: Jong Hyup Lee, Yongin-si (KR); Kyoung Man Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 94 days.

(21) Appl. No.: 14/196,120

(22) Filed: Mar. 4, 2014

(65) Prior Publication Data

US 2014/0267329 A1 Sep. 18, 2014

(30) Foreign Application Priority Data

Mar. 15, 2013 (KR) ........................ 10-2013-0028330

(51) Int. Cl.
*G09G 5/18* (2006.01)
*G06T 1/20* (2006.01)
*G09G 5/395* (2006.01)

(52) U.S. Cl.
CPC . *G06T 1/20* (2013.01); *G09G 5/18* (2013.01); *G09G 5/395* (2013.01); *G09G 2310/04* (2013.01); *G09G 2330/022* (2013.01)

(58) Field of Classification Search
CPC .............................. G09G 5/18; G09G 2310/04
See application file for complete search history.

(56) References Cited

U.S. PATENT DOCUMENTS

| | | | |
|---|---|---|---|
| 5,736,981 A * | 4/1998 | Nobutani | G09G 3/364 345/536 |
| 6,803,895 B2 | 10/2004 | Knapp et al. | |
| 7,133,013 B2 | 11/2006 | Kamezaki et al. | |
| 7,295,178 B2 | 11/2007 | Nakano et al. | |
| 8,072,394 B2 | 12/2011 | Ludden et al. | |
| 8,130,216 B2 | 3/2012 | Washio et al. | |
| 8,159,450 B2 | 4/2012 | Doi | |
| 8,199,136 B2 | 6/2012 | Kohda et al. | |
| 8,259,035 B2 | 9/2012 | Montheard et al. | |
| 2002/0118144 A1* | 8/2002 | Edmonds | G09G 5/006 345/1.1 |
| 2003/0122773 A1* | 7/2003 | Washio | G09G 3/3648 345/103 |
| 2004/0080515 A1* | 4/2004 | Hagiwara | G09G 5/005 345/581 |
| 2005/0146532 A1* | 7/2005 | Miyazaki | G09G 3/2096 345/600 |
| 2006/0103675 A1* | 5/2006 | Takayama | G09G 5/395 345/629 |
| 2006/0152515 A1* | 7/2006 | Lee | G06F 3/1415 345/537 |

(Continued)

*Primary Examiner* — Jacinta M Crawford
*Assistant Examiner* — Jonathan M Cofino
(74) *Attorney, Agent, or Firm* — Myers Bigel, P.A.

(57) ABSTRACT

A method of operating a display system may include receiving an indication signal indicating a data update, receiving data, and updating a whole frame on the display with an image corresponding to the data based on the indication signal corresponding to a whole frame or updating a partial frame on the display with an image corresponding to the data based on the indication signal corresponding to a partial frame.

16 Claims, 13 Drawing Sheets

Display ImageBefore Updating        Display Image After Updating

(56) References Cited

U.S. PATENT DOCUMENTS

| | | | |
|---|---|---|---|
| 2008/0007508 A1* | 1/2008 | Yoneyama | G09G 5/005 345/100 |
| 2008/0143757 A1* | 6/2008 | Furihata | G09G 3/3406 345/690 |
| 2010/0164857 A1 | 7/2010 | Liu et al. | |
| 2010/0289722 A1 | 11/2010 | Kitazawa | |
| 2010/0321402 A1* | 12/2010 | Han | G06F 3/1415 345/619 |
| 2011/0141133 A1* | 6/2011 | Sankuratri | G06F 3/1454 345/600 |
| 2012/0032960 A1* | 2/2012 | Kameyama | H04N 7/17318 345/428 |
| 2013/0088502 A1* | 4/2013 | Shih | G09G 5/003 345/545 |
| 2013/0187962 A1* | 7/2013 | Vieri | G09G 3/20 345/698 |
| 2014/0184611 A1* | 7/2014 | Wyatt | G09G 3/36 345/501 |

\* cited by examiner

Display Image Before Updating    Display Image After Updating

METHODS AND SYSTEMS ON CHIP FOR
UPDATING FRAMES BASED ON AN
INDICATION SIGNAL FOR A DISPLAY
SYSTEM

CROSS-REFERENCE TO RELATED APPLICATIONS

This application claims priority under 35 U.S.C. §119(a) to Korean Patent Application No. 10-2013-0028330 filed on Mar. 15, 2013 in the Korean Intellectual Property Office, the entire contents of which is hereby incorporated by reference.

FIELD

The present inventive concept relates to systems on chip, and more particularly to systems on chip including display systems.

BACKGROUND

As the display resolution of portable devices such as a smart phones or tablet personal computers (PC) increases, the bandwidth utilized for the display of image data may increase. At each frame refresh, a device may need to read the all of the image data to update even only a partial frame included in the whole frame of the image. Reading the whole image data may waste bandwidth and increase power consumption.

SUMMARY

According to an embodiment of the inventive concept, there is provided a method of operating a display system, including receiving an indication signal indicating a data update, receiving data, and updating a whole frame on the display with an image corresponding to the data based on the indication signal corresponding to a whole frame or updating a partial frame on the display with an image corresponding to the data based on the indication signal corresponding to a partial frame.

The indication signal may be included in a header of a data packet which includes the data. The indication signal may be transmitted in a back porch interval of a vertical synchronization signal. The data may be transmitted after the back porch interval of the vertical synchronization signal. The indication signal and the data may be suitable for an RGB interface.

According to other embodiments of the inventive concept, there is provided an update control circuit. The update control circuit may include a special function register configured to store addresses and a control circuit configured to generate an indication signal indicating a data update based on an update control signal and the addresses. The indication signal may be included in a header of a data packet. An encoder configured to encode the indication signal may be further included.

The update control circuit may include an update detecting circuit configured to generate the update control signal corresponding to a determination of whether to update a whole frame or a partial frame included in the whole frame.

According to other embodiments of the inventive concept, there is provided a system on chip (SoC). The SoC may include an update detecting circuit configured to generate an update control signal corresponding to a determination of whether to update a whole frame or a partial frame included in the whole frame and an update control circuit configured to generate an indication signal corresponding to the update control signal.

The update control circuit may include a special function register configured to set a plurality of addresses defining the partial frame and a control circuit configured to generate the indication signal corresponding to the update control signal and the addresses.

The indication signal may be included in a header of a data packet. An encoder may be configured to generate an encoded indication signal by encoding the indication signal and a transmission interface may be configured to transmit the encoded indication signal during a back porch interval of a vertical synchronization signal. The update control circuit may further include an encoder configured to encode the indication signal.

A dynamic memory access (DMA) controller may be configured to read data corresponding to only the partial frame using the addresses and the transmission interface may be further configured to transmit the data after the back porch interval of the vertical synchronization signal. The transmission interface may be an RGB interface.

According to other embodiments of the inventive concept, there is provided an application processor including the system on chip.

According to other embodiments of the inventive concept, there is provided a mobile device. The mobile device may include a display controller which generates an indication signal indicating a data update for a partial frame included in a whole frame, reads and processes data only corresponding to the partial frame, transmits the indication signal during a back porch interval of a vertical synchronization signal, and transmits the processed data after the back porch interval. The mobile device may also include a display driver configured to update an image corresponding to the processed data to a window included in a display based on the indication signal.

According to other embodiments of the inventive concept, there is provided an operation method. The operational method may include detecting an update region where a display image needs to be updated, transmitting a display data relating only to a predefined partial frame region based upon a determination that the update region is completely contained within the partial frame region, wherein the partial frame region is less than a whole frame region, and updating a display image corresponding to the display data. The operational method may also include transmitting a display data relating to the whole frame region based upon a determination that at least some portion of the update region is not within the partial frame region.

The operational method may also include transmitting an indication signal which indicates the region corresponding to the display data. The display data and indication signal may be received at a display driver. The display driver may update a video memory based upon the display data and indication signal.

The display image corresponding to a region including the entire whole frame region outside of the partial frame region may remain unchanged when the display data relates only to the partial frame region.

DETAILED DESCRIPTION OF THE EMBODIMENTS

Figure 1:
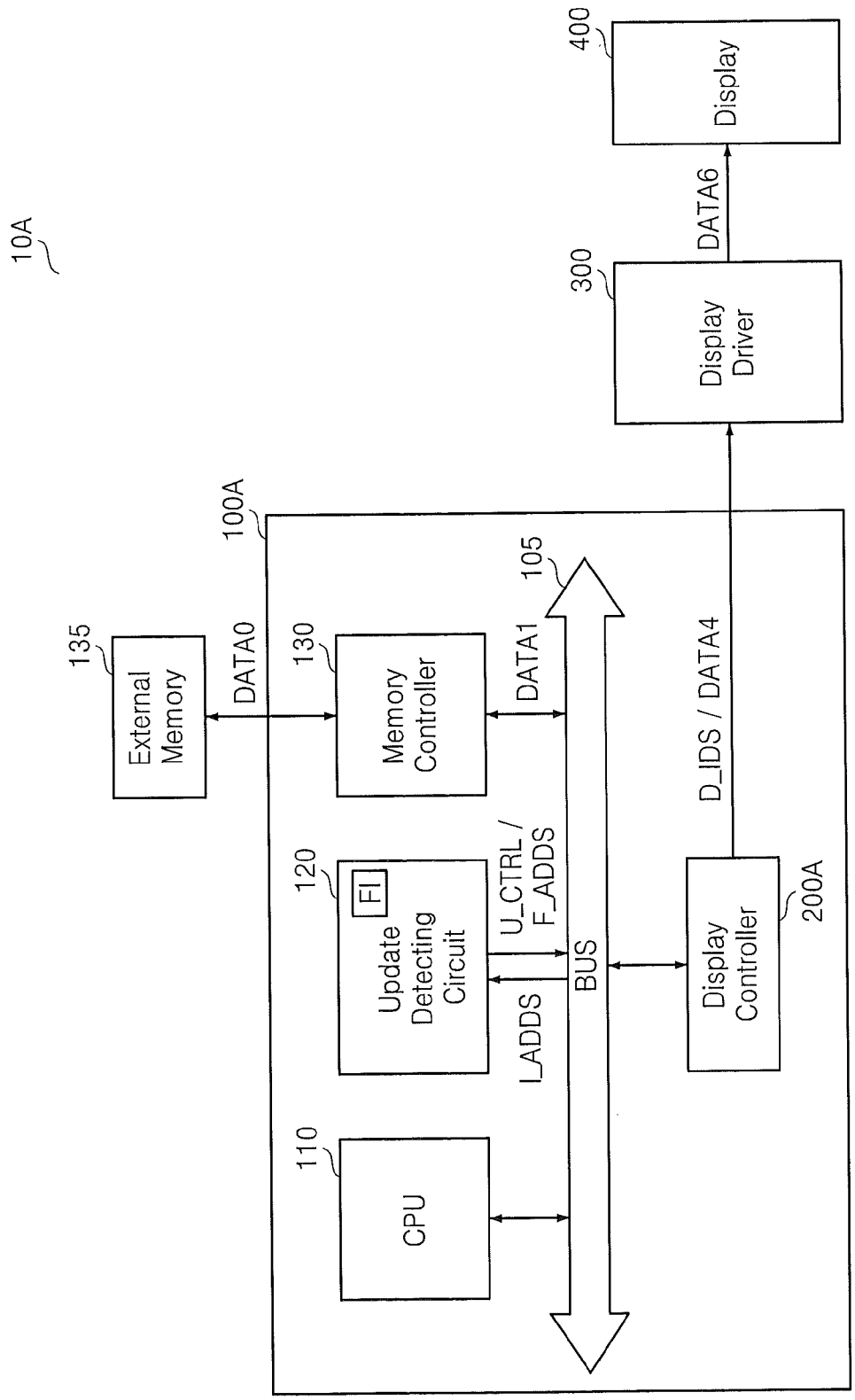
FIG. 1 is a block diagram of a display system according to an exemplary embodiment of the present inventive concept.

Embodiments of the inventive concept are described more fully with reference to the accompanying drawings. The inventive concept may, however, be embodied in various different forms and should not be construed as limited to the embodiments set forth herein. Rather, these embodiments are provided as examples so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present inventive concept.

The present invention is described in part below with reference to block diagrams of methods and systems according to various embodiments. It will be understood that a block of the block diagrams and combinations of blocks in the block diagrams may be implemented at least in part by software or hardware components, such as a field programmable gate array (FPGA) or an application specific integrated circuit (ASIC), which performs certain tasks. A block may advantageously be configured to reside in the addressable storage medium and configured to execute on one or more processors. Thus, a block may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the blocks may be combined into fewer blocks or further separated into additional blocks.

FIG. 1 is a block diagram of a display system according to an example embodiment of the present inventive concept.

Referring to FIG. 1, a display system 10A may include a display processing device 100A, an external memory 135, a display driver 300, and a display 400. The display system 10A may be embodied in a personal computer (PC), a portable electronic device or mobile device, or an electronic device including the display 400 displaying image data.

The portable electronic device may be embodied in a laptop computer, a mobile phone, a smart phone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a handheld game console, or an e-book.

The display processing device 100A may control the external memory 135 and/or the display driver 300. The display processing device 100A may entirely control an operation of the display system 10A.

The display processing device 100A may determine whether to update a whole frame of a display image displayed on the display 400 or a partial frame included in the whole frame, generate an indication signal D_IDS indicating a data update for the whole frame or the partial frame, read and process data DATA0 only corresponding to the whole frame or the partial frame from the external memory 135, and control so that the display driver 300 may update an image corresponding to the processed data DATA4 entirely on the display 400 or update the image in a window included in the display 400 based on the indication signal D_IDS.

The display processing device 100A generates and outputs an indication signal D_IDS indicating a data update for the whole frame or the partial frame, thereby controlling so that the display driver 400 may update the whole frame or the partial frame based on the indication signal D_IDS.

In addition, the display processing device 100A may read and process data DATA0 only corresponding to the partial frame from the external memory 135 when updating the partial frame, preventing waste of bandwidth of data by transmitting the processed data DATA4 only to the display driver 300, and reduce a power consumed when transmitting the data.

The display processing device 100A may be embodied in a printed circuit board (PCB) like a motherboard, an integrated circuit (IC), or a system on chip (SoC). For example, the display processing device 100A may be an application processor.

The display processing device 100A may include a central processing unit (CPU) 110, an update detecting circuit 120, a memory controller 130, and a display controller 200A.

The CPU 110 may control an entire operation of the display processing device 100A. For example, the CPU 110 may control an operation of each component 120, 130, and 200A. The CPU 110, the update detecting circuit 120, the memory controller 130, and the display controller 200A may be connected by a bus 105.

According to an example embodiment, the CPU 110 may be embodied in a multi-core. The multi-core is a computing component having two or more independent cores. The update detecting circuit 120 may determine whether to update a whole frame of a display currently displayed on the display 400 or a partial frame included in the whole frame, and generate an update control signal U_CTRL according to a result of the determination.

FIG. 1 illustrates the update detecting circuit 120 is embodied in the display processing device 100A; however, it may be embodied in a display controller 200A. According to an example embodiment, the update detecting circuit 120 may compare frame information (FI) with input addresses I_ADDS, and determine whether to update the whole frame or the partial frame according to a result of the comparison. For example, the frame information (FI) may be information set according to a user or a specification of the display 400. In addition, the frame information (FI) may be set by the CPU 110.

The frame information (FI) may include a start address and an end address of the whole frame. The whole frame may be defined by the start address and the end address.

Figure 2:
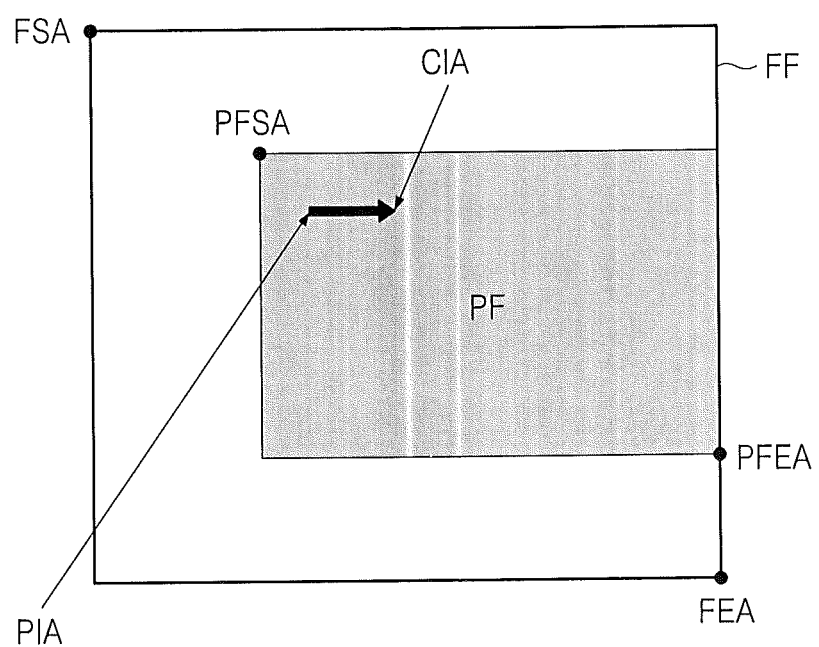
FIG. 2 is a conceptual diagram for describing an operation of the update detecting circuit illustrated in FIG. 1 which detects a region where a display image needs to be updated is a partial frame.
Figure 3:
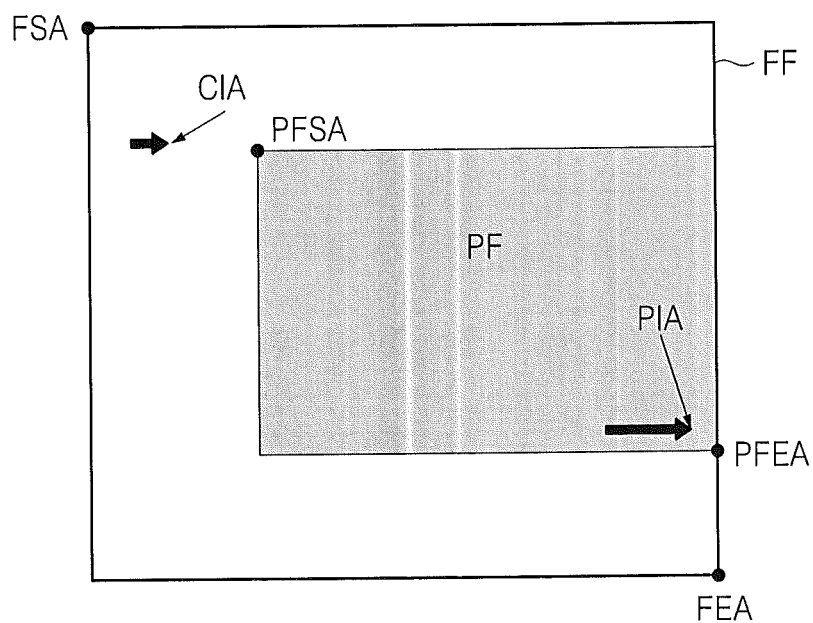
FIG. 3 is a conceptual diagram for describing an operation of the update detecting circuit illustrated in FIG. 1 which detects a region where a display image needs to be updated is a whole frame.

FIG. 2 is a conceptual diagram for describing an operation of the update detecting circuit illustrated in FIG. 1 which detects a region where the display image needs to be updated is a partial frame, and FIG. 3 is a conceptual diagram for describing an operation of the update detecting circuit illustrated in FIG. 1 which detects a region where the display image needs to be updated is a whole frame.

The whole frame FF may include addresses from a start address FSA to an end address FEA. The addresses of the whole frame FF may have a linear or sequential relationship.

Referring to FIGS. 1 and 2, a current input address CIA may be larger than the start address FSA of the whole frame FF, and smaller than the end address FEA of the whole frame FF. The current input address CIA may be larger than a previous input address PIA.

The previous input address PIA and the current input address CIA may have a sequential or linear relationship. Accordingly, the update detecting circuit 120 may determine that a region where a display image needs to be updated is the partial frame PF based on the frame information FI and the input addresses I_ADDS. When a first input address among the input addresses I_ADDS is the start address PFSA of the partial frame PF, and when a last input address is the end address PFEA of the partial frame PF, the update detecting circuit 120 may determine a region where a display image needs to be updated is the partial frame PF.

Referring to FIGS. 1 and 3, a current input address CIA may be larger than the start address FSA of the whole frame FF, and may be smaller than the end address FEA of the whole frame FF.

The current input address CIA may not be larger than the previous input address PIA. The previous input address PIA and the current input address CIA may not have a sequential or linear relationship. Accordingly, the update detecting circuit 120 may determine that a region where a display image needs to be updated is not the partial frame PF based on the frame information FI and the input addresses I_ADDS.

When a first input address among the input addresses I_ADDS is the start address FSA of the whole frame FF, and a last input address is the end address FEA of the whole frame FF, the update detecting circuit 120 may determine that the region where a display image needs to be updated is the whole frame FF.

Referring to FIGS. 1 to 3, the update detecting circuit 120 may store frame addresses F_ADDS of the frame FF or PF where a current update is needed, e.g., the start address FSA or PFSA and the end address FEA or PFEA defining the frame FF or PF, as the frame information FI, and may use the frame information FI when determining whether a next update is needed.

The update detecting circuit 120 may generate an update control signal U_CTRL according to a result of determining whether to update or not, and output the update control signal U_CTRL to the display controller 200A.

The update detecting circuit 120 may output the frame addresses F_ADDS to the display controller 200A so that the display controller 200A may access data DATA0 only corresponding to an update region FF or PF from the external memory 135.

The memory controller 130 may receive data DATA0 stored in the external memory 135 according to a control of the display controller 200A, and transmit data DATA1 to peripheral devices, e.g., the display controller 200A.

The memory controller 130 may transmit data DATA1, corresponding to the whole frame FF or the partial frame PF of a display image currently displayed on the display 400 stored in the external memory 135, to the display controller 200A according to a control of the display controller 200A.

The external memory 135 may store data DATA0 corresponding to the whole frame FF or the partial frame PF which is determined to need an update. The external memory 135 may be embodied in a volatile memory device or a non-volatile memory device.

The volatile memory device may be embodied in, for example, a dynamic random access memory (DRAM), a static random access memory (SRAM), a thyristor RAM (T-RAM), a zero capacitor RAM (Z-RAM), or a Twin Transistor RAM (TTRAM).

The non-volatile memory device may be embodied in, for example, an Electrically Erasable Programmable Read-Only Memory (EEPROM), a flash memory, a Magnetic RAM (MRAM), a Spin-Transfer Torque (STT)-MRAM, a Conductive bridging RAM (CBRAM), a Ferroelectric RAM (FeRAM), a Phase change RAM (PRAM), a Resistive RAM (RRAM), a Nanotube RRAM, a Polymer RAM (PoRAM), a Nano Floating Gate Memory (NFGM), a holographic memory, a Molecular Electronics Memory Device, or an Insulator Resistance Change Memory.

In addition, the non-volatile memory device may be embodied in a flash-based memory device, e.g., a secure digital (SD) card, a multimedia card (MMC), an embedded-MMC (eMMC), a USB flash drive, or a universal flash storage (UFS).

The display controller 200A may generate an indication signal D_IDS indicating a data update for the whole frame FF or the partial frame PF using frame addresses F_ADDS in response to an update control signal U_CTRL, read and process data DATA1 only corresponding to the whole frame FF or the partial frame PF, and output the generated indication signal D_IDS and the processed data DATA4 to the display driver 300.

Figure 4:
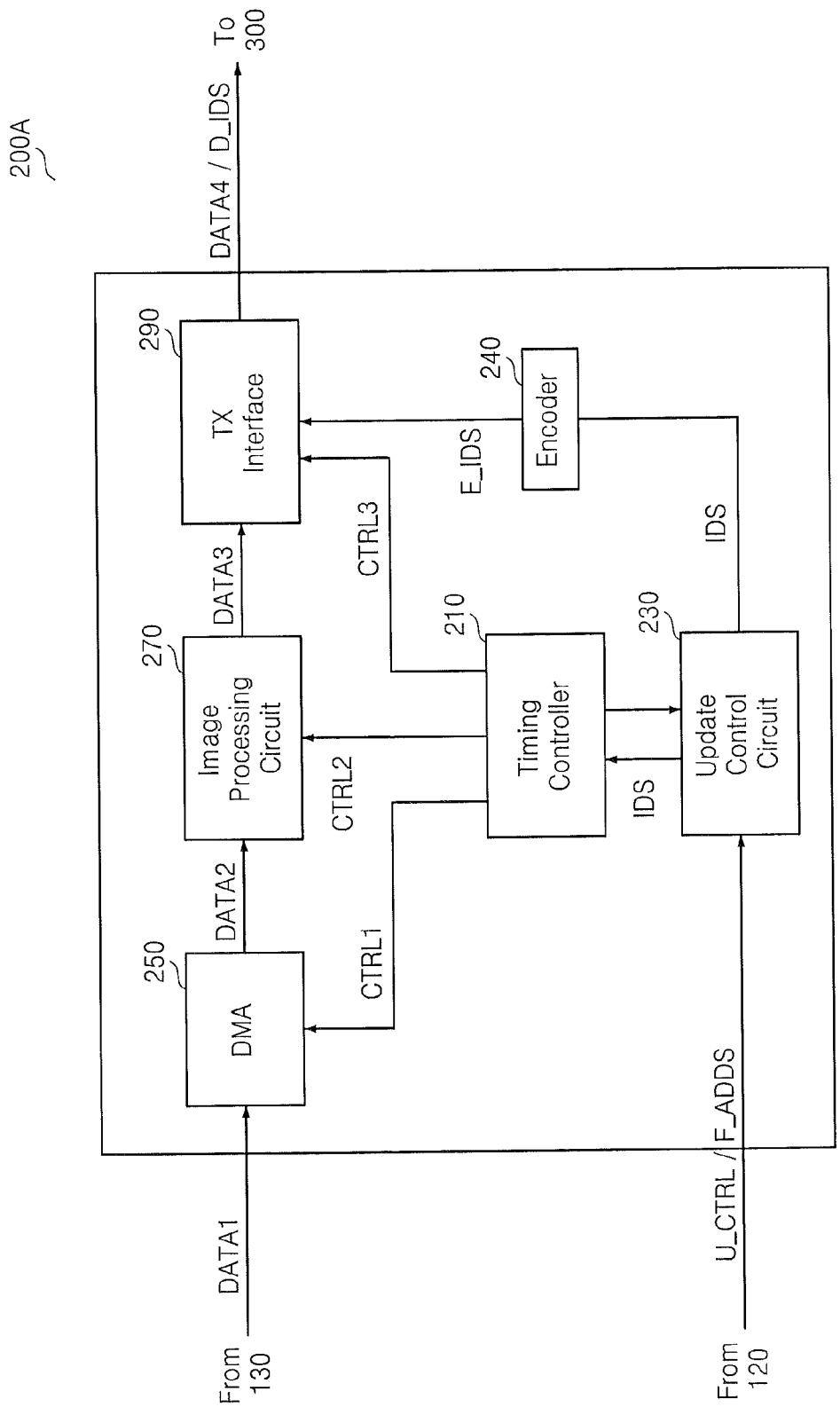
FIG. 4 is a block diagram depicting an example embodiment of the display controller illustrated in FIG. 1.

FIG. 4 is a block diagram depicting an example embodiment of a display controller illustrated in FIG. 1. Referring to FIGS. 1 to 4, the display controller 200A may include a timing controller 210, an update control circuit 230, an encoder 240, a dynamic memory access (DMA) controller 250, an image processing circuit 270, and a transmission interface 290.

The timing controller 210 may control a timing of each component 230, 240, 250, 270, and 290. In addition, the timing controller 210 may generate control signals CTRL1, CTRL2, and CTRL3 based on the indication signal IDS output from the update control circuit 230, and output the control signals to components 250, 270, and 290. The timing controller 210 may control a timing of each component 250, 270, and 290 based on the indication signal IDS.

The update control circuit 230 may generate the indication signal IDS indicating a data update for the whole frame FF or the partial frame PF using the frame addresses F_ADDS in response to the update control signal U_CTRL, and output the indication signal IDS to each component 210 and 240.

FIG. 4 illustrates that the frame addresses F_ADDS input to the update control circuit 230 are transmitted from the update detecting circuit 120. However, the frame addresses F_ADDS may be transmitted from the CPU 110.

Figure 5:
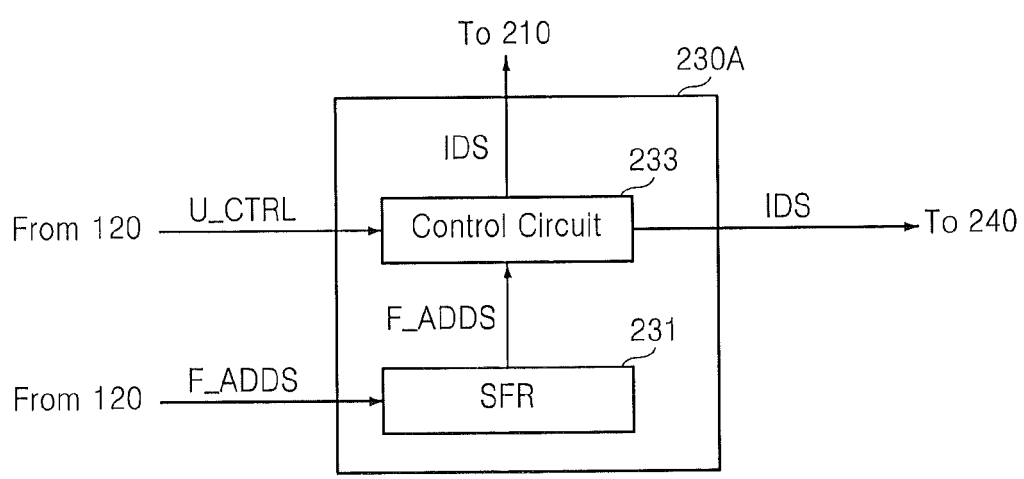
FIG. 5 is a block diagram depicting an example embodiment of the update control circuit illustrated in FIG. 4.

FIG. 5 is a block diagram depicting an example embodiment of an update control circuit illustrated in FIG. 4. Referring to FIGS. 1 to 5, the update control circuit 230A may include a special function register (SFR) 231 and a control circuit 233. The update control circuit 230A illustrated in FIG. 5 depicts an example embodiment of the update control circuit 230 illustrated in FIG. 4. The SFR 231 may store frame addresses F_ADDS.

The control circuit 233 may generate an indication signal IDS indicating a data update for the whole frame FF or the partial frame PF using the frame addresses F_ADDS output from the SFR 231 in response to the update control signal U_CTRL.

For example, when the frame addresses F_ADDS is the start address FSA and the end address FEA of the whole frame FF, the control circuit 233 may generate an indication signal IDS indicating a data update of the whole frame FF.

When the frame addresses F_ADDS is the start address PFSA and the end address PFEA f the partial frame PF, the control circuit 233 may generate an indication signal IDS indicating a data update of the partial frame PF.

According to an example embodiment, the indication signal IDS may be included in a header of a data packet. The indication signal IDS may include the frame addresses F_ADDS. The indication signal IDS may include information on data size, information on page width, and position information corresponding to the whole frame FF or the partial frame PF.

The control circuit 233 may output the indication signal IDS to each component 210 and 240. The encoder 240 may encode the indication signal IDS, and output the encoded indication signal E_IDS to the transmission interface 290.

Figure 6:
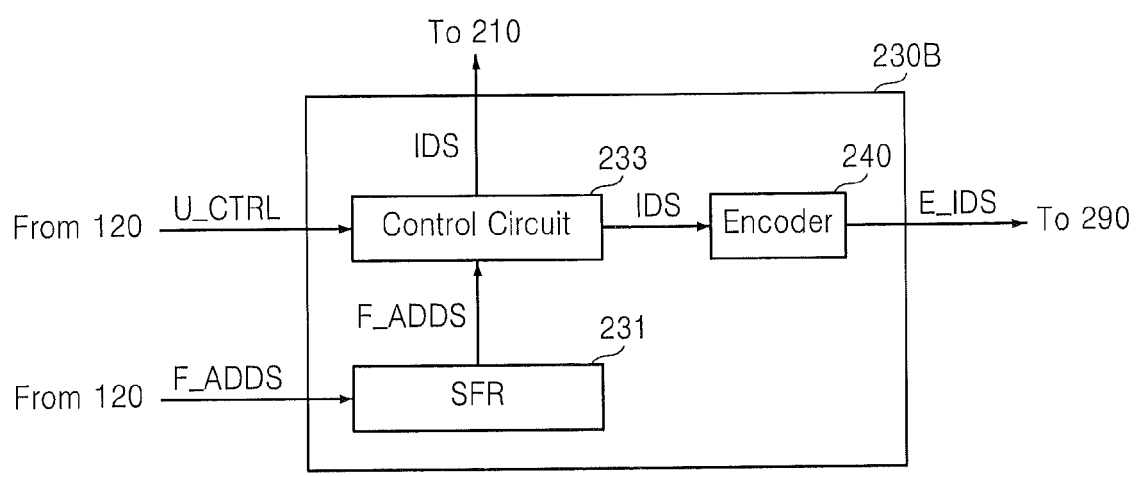
FIG. 6 is a block diagram depicting another example embodiment of the update control circuit illustrated in FIG. 4.

FIG. 6 is a block diagram depicting another example embodiment of the update control circuit illustrated in FIG. 4. Referring to FIGS. 1 to 6, an update control circuit 230B illustrated in FIG. 6 depicts another example embodiment of the update control circuit 230 illustrated in FIG. 4. The update control circuit 230B may include the SFR 231, the control circuit 233, and the encoder 240. The encoder 240 may be embodied inside the update control circuit 230B.

The DMA controller 250 may receive data DATA1 corresponding to the whole frame FF or the partial frame PF from the memory controller 130 according to a control signal CTRL1 without using the CPU 110, and transmit data DATA2 to the image processing circuit 270.

The image processing circuit 270 may receive the data DATA2 transmitted from the DMA controller 250 according to a control signal CTRL2, and perform image processing operations. For example, the image processing circuit 270 may perform operations such as color space conversion, blending, 3D merging, or image enhancement.

The image processing circuit 270 may generate and output processed data DATA3 to the display driver 300. For example, the image processing circuit 270 may process the data DATA2 through one of the image processing operations, and output the processed data DATA3 to the display driver 300.

The transmission interface 290 may process an encoded indication signal E_IDS and/or processed data DATA3 according to a control signal CTRL3, and transmit the indication signal D_IDS and/or data DATA4 to the display driver 300. Here, the indication signal D_IDS and data DATA4 output from the transmission interface 290 may be an indication signal and data suitable for a protocol of the transmission interface 290. The indication signal D_IDS and data DATA4 may be embodied in data or a data packet suitable for the protocol of the transmission interface 290. The indication signal D_IDS may be included in the header of the data package including the data DATA4 and transmitted.

The transmission interface 290 may be embodied in a CPU interface, an RGB interface, or a serial interface. The transmission interface 290 may be embodied in a mobile display digital interface (MDDI), a mobile industry processor interface (MIPI®), a serial peripheral interface (SPI), an inter IC (I²C) interface, a displayport (DP), or an embedded displayport (eDP).

Figure 7:
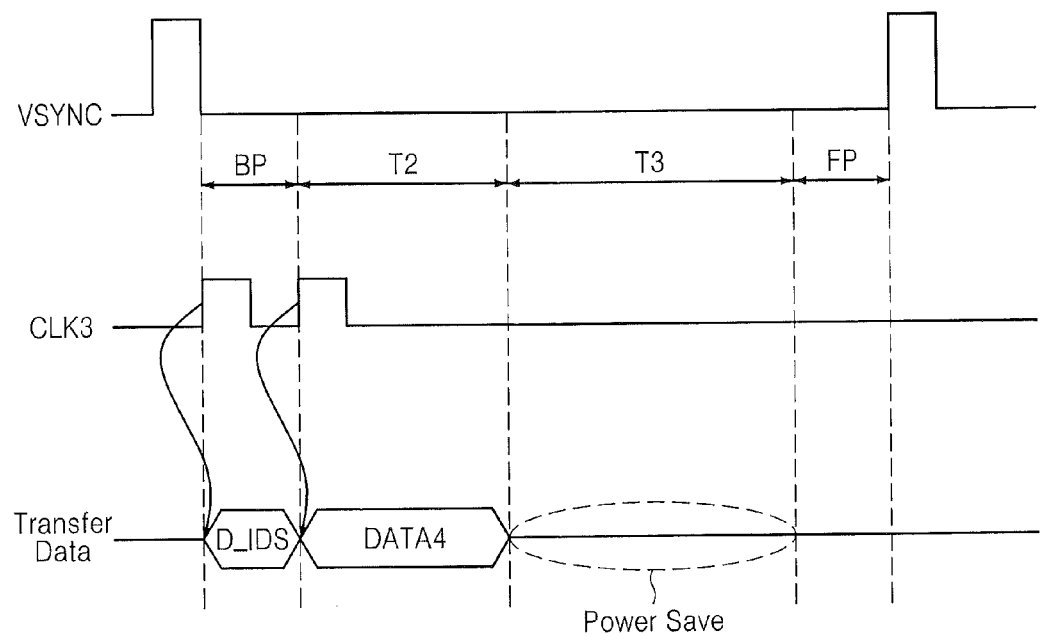
FIG. 7 is a timing diagram for describing an operation method of the display controller illustrated in FIG. 1.

FIG. 7 is a timing diagram for describing an operation method of the display controller illustrated in FIG. 1. When a region where a current update is needed is the partial frame PF of a display image displayed on the display 400 for convenience of description in FIG. 7, an operation method of the display controller 200A is illustrated; however, an example embodiment of the present inventive concept is not limited thereto.

Referring to FIGS. 1 to 7, there may be a back porch interval BP, data transmission intervals T2 and T3, and a front porch interval FP between vertical synchronization signals VSYNCs.

The display controller 200A may transmit the indication signal D_IDS during the back porch interval BP of the vertical synchronization signal VSYNC according to a control signal CTRL3. The display controller 200A may transmit the data DATA4 after the back porch interval BP of the vertical synchronization signal VSYNC according to the control signal CTRL3.

When a region where a current update is needed is the partial frame PF of a display image displayed on the display 400, the display controller 200A may transmit data DATA4 only corresponding to the partial frame PF only in an interval T2 after the back porch interval BP.

The display controller 200A generates and outputs an indication signal D_IDS indicating a data update for the partial frame PF, thereby controlling so that the display driver 400 may update an image corresponding to the data DATA4 of the partial frame PF based on the indication signal D_IDS.

In addition, the display controller 200A may prevent waste of data bandwidth by transmitting the data DATA4 only corresponding to the partial frame PF only in a interval T2 after the back porch interval BP of the vertical synchronization signal VSYNC, and does not transmit the remaining data in a interval T3, thereby reducing a power consumed by transmission of the remaining data.

The display driver 300 may control the display 400 so that an image corresponding to the data DATA4 may be updated entirely on the display 400 or updated in a window included in the display 400 based on the indication signal D_IDS generated by the display processing device 100A. The display driver 300 may update an image corresponding to the data DATA4 of the whole frame FF or the partial frame PF on the display 400 based on the indication signal D_IDS indicating a data update for the whole frame FF or the partial frame PF.

Figure 9:
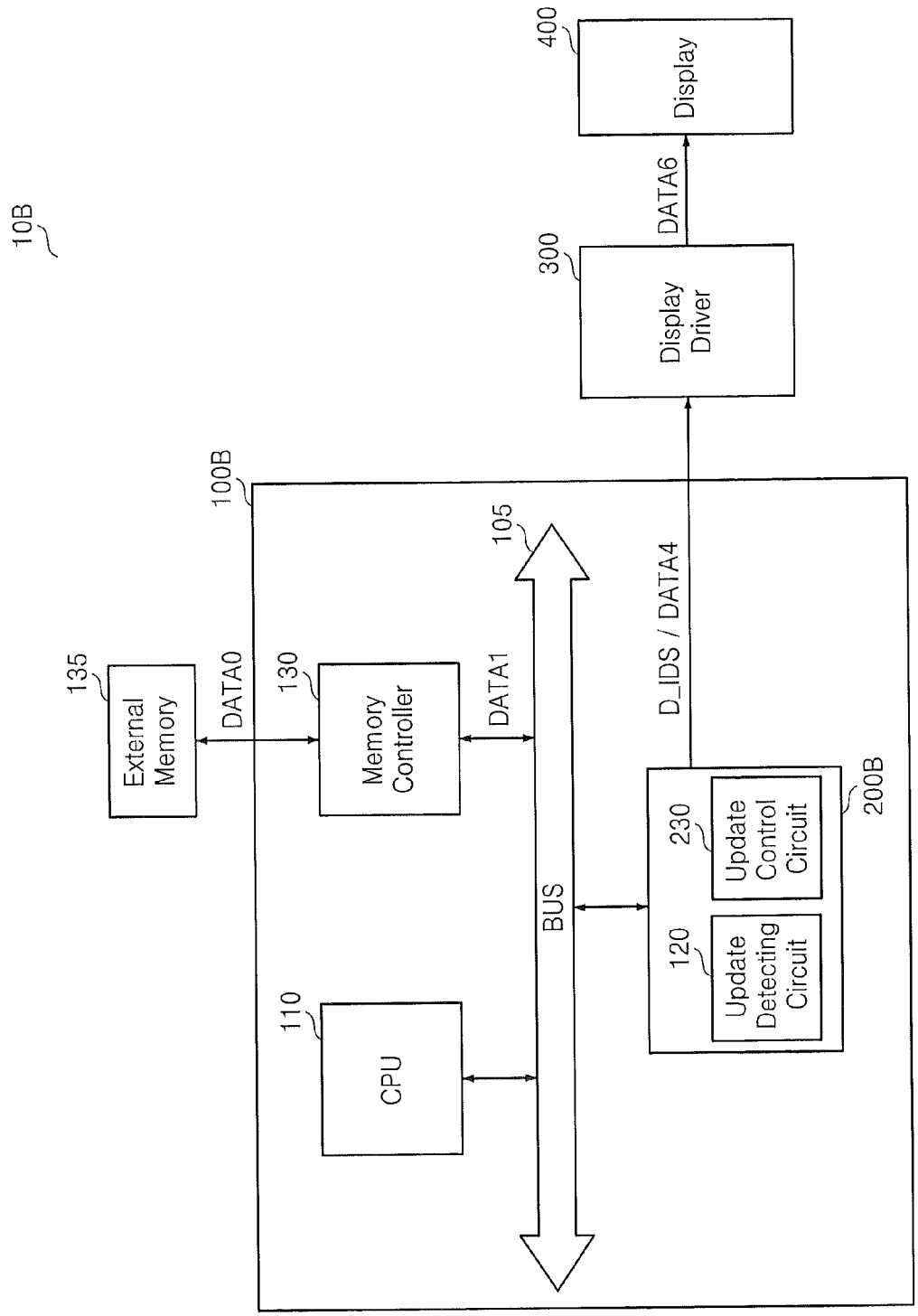
FIG. 9 is a block diagram of the display system according to another example embodiment of the present inventive concept.
Figure 10:
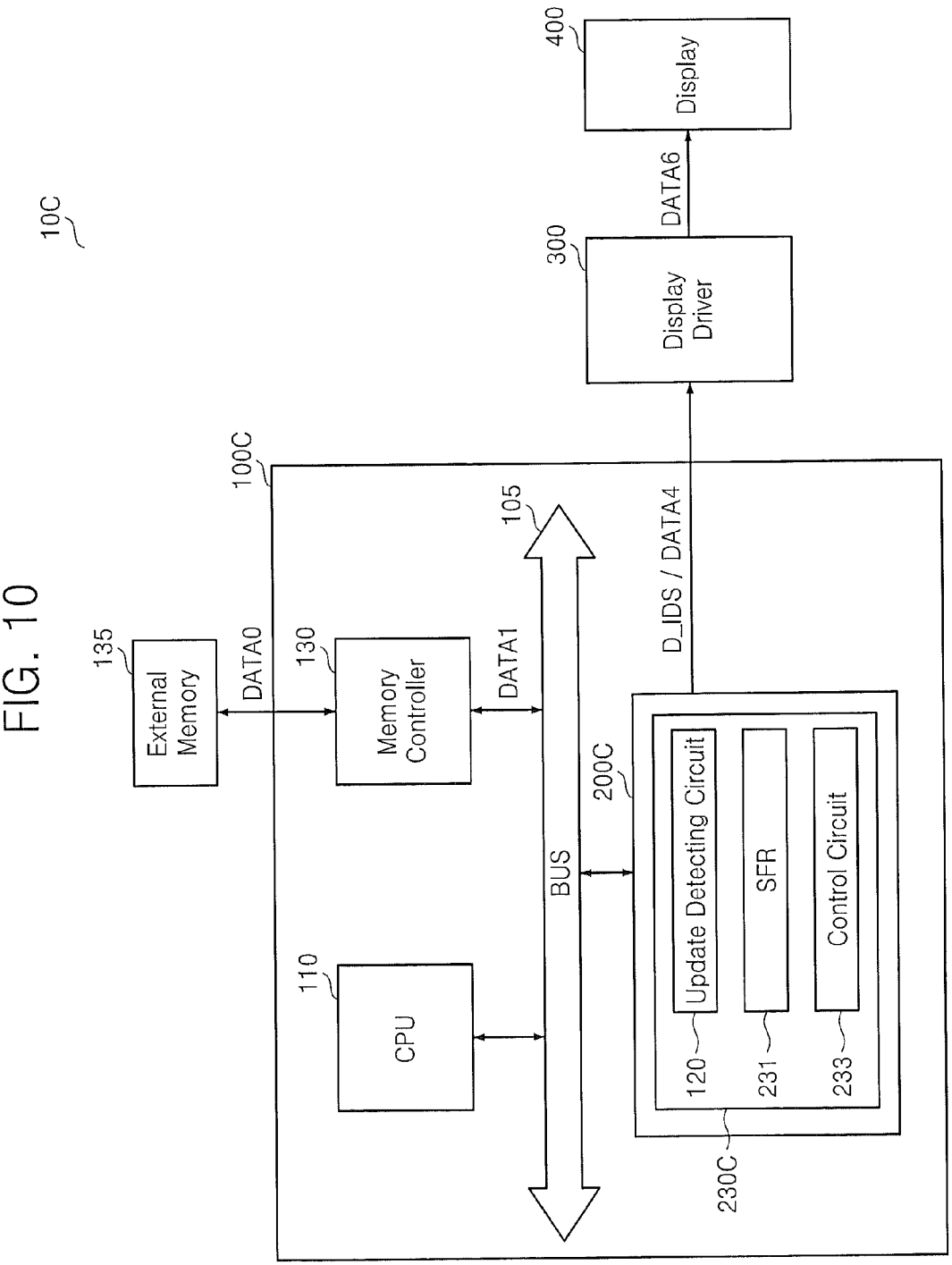
FIG. 10 is a block diagram of the display system according to still another example embodiment of the present inventive concept.

The display driver 300 is illustrated as a separate circuit in FIGS. 1, 9, and 10. However, the display driver may be embodied inside the display 400 or inside the display controller 200A, 200B, or 200C according to other example embodiments.

Figure 8:
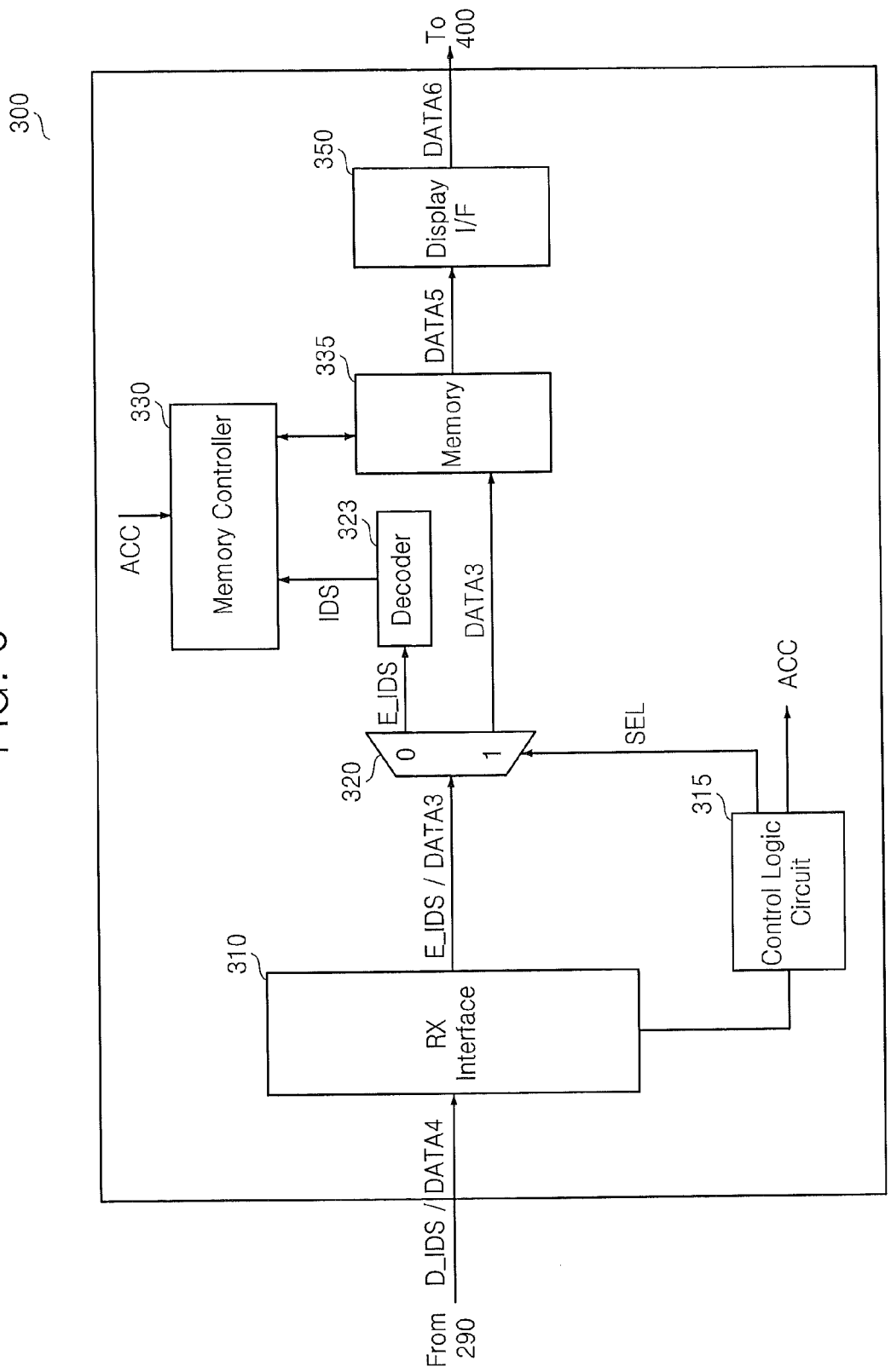
FIG. 8 is a block diagram of the display driver illustrated in FIG. 1.

FIG. 8 is a block diagram of a display driver illustrated in FIG. 1. Referring to FIGS. 1 to 8, the display driver 300 may include a receiving interface 310, a control logic circuit 315, a data distribution circuit 320, a decoder 323, a memory controller 330, a memory 335, and a display interface 350.

The receiving interface 310 may process a signal D_IDS or DATA4 output from the transmission interface 290, and output the processed signal BIDS or DATA3. The receiving interface 310 may be connected to the transmission interface 290.

The control logic circuit 315 may generate a selection signal SEL and an access control signal ACC according to control information included in the output signal E_IDS or DATA3 of the receiving interface 310. For example, when an indication signal E_IDS is output from the receiving interface 310, the control logic circuit 315 may output a selection signal SEL having a first level, e.g., a logic 0 or a low level, to the data distribution circuit 320 according to the control information.

When the data DATA3 is output from the receiving interface 310, the control logic circuit 315 may output a selection signal SEL having a second level, e.g., logic 1 or high level, to the data distribution circuit 320 according to the control information.

According to an example embodiment, the control logic circuit 315 may output both a control signal for enabling the data distribution circuit 320 and a selection signal SEL to the data distribution circuit 320 according to the control information.

The data distribution circuit 320 may transmit an indication signal E_IDS to the decoder 323 or data DATA3 to the memory 335 according to a level of the selection signal SEL.

For example, when the selection signal SEL is at the first level, the data distribution circuit 320 may transmit the indication signal BIDS to the decoder 323, and when the selection signal SEL is at the second level, the data distribution circuit 320 may transmit data DATA3 to the memory 335. According to an example embodiment, the data distribution circuit 320 may be embodied in a de-multiplexer.

The decoder 323 may decode the indication signal E_IDS transmitted from the data distribution circuit 320, and transmit the decoded indication signal IDS to the memory controller 330.

The memory controller 330 may control an access operation for the memory 335, e.g., a write operation of writing data in the memory 335 and a read operation of reading data from the memory 335, according to an access control signal ACC.

The memory 335 may store the data DATA3 output from the data distribution circuit 320 according to a control of the memory controller 330. The memory 335 may update data DATA3 of the whole frame FF or the partial frame PF which is determined to need a current update according to a control of the memory controller 330. The memory 335 may be embodied in a frame memory.

The display interface 350 may process data DATA5 output from the memory 335 and transmit the processed data DATA6 to the display 400. For example, the display interface 350 may convert image data DATA5 which is a digital signal into an image signal DATA6 which may be an analog signal.

The display 400 may display an image corresponding to the image signal DATA6 output from the display driver 300. The display 400 may display an image which is updated.

For example, the display 400 may be embodied in a touch screen, a liquid crystal display (LCD), a thin film transistor-liquid crystal display (TFT-LCD), a liquid emitting diode (LED) display, an organic LED (OLED) display, an active matrix OLED (AMOLED) display, or a flexible display.

FIG. 9 is a block diagram of a display system according to another example embodiment of the present inventive concept. Referring to FIG. 9, a display system 10B may include a display processing device 100B, the external memory 135, the display driver 300, and the display 400.

The display processing device 100B may include the CPU 110, the memory controller 130, and the display controller 200B. The update detecting circuit 120 embodied in a separate circuit inside the display processing device 100A of FIG. 1 may be embodied inside the display controller 200B.

The display controller 200B may determine whether to update the whole frame FF or the partial frame PF included in the whole frame FF of a display image displayed on the display 400, generate an indication signal D_IDS indicating a data update for the whole frame FF or the partial frame PF, read and process data DATA1 only corresponding to the whole frame FF or the partial frame PF from the external memory 135, and control so that the display driver 300 may update an image corresponding to the processed data DATA4 entirely on the display 400 or update the image in a window included in the display 400 based on the indication signal D_IDS.

An update control circuit 230 illustrated in FIG. 9 may be an update control circuit 230A or 230B illustrated in FIG. 5 or 6.

FIG. 10 is a block diagram of a display system according to still another example embodiment of the present inventive concept. Referring to FIG. 10, a display system 10C may include a display processing device 100C, the external memory 135, the display driver 300, and the display 400.

The display processing device 100C may include the CPU 110, the memory controller 130, and the display controller 200c. The update detecting circuit 120 embodied in a separate circuit inside the display processing device 100A of FIG. 1 may be embodied inside the update control circuit 230C of the display controller 200C.

The update control circuit 230C may determine whether to update the whole frame FF or the partial frame PF included in the whole frame FF of a display image currently displayed on the display 400, generate an indication signal IDS indicating a data update for the whole frame FF or the partial frame PF using frame addresses F_ADDS according to a result of the determination, and output the indication signal IDS to each component 210 and 240.

Figure 11:
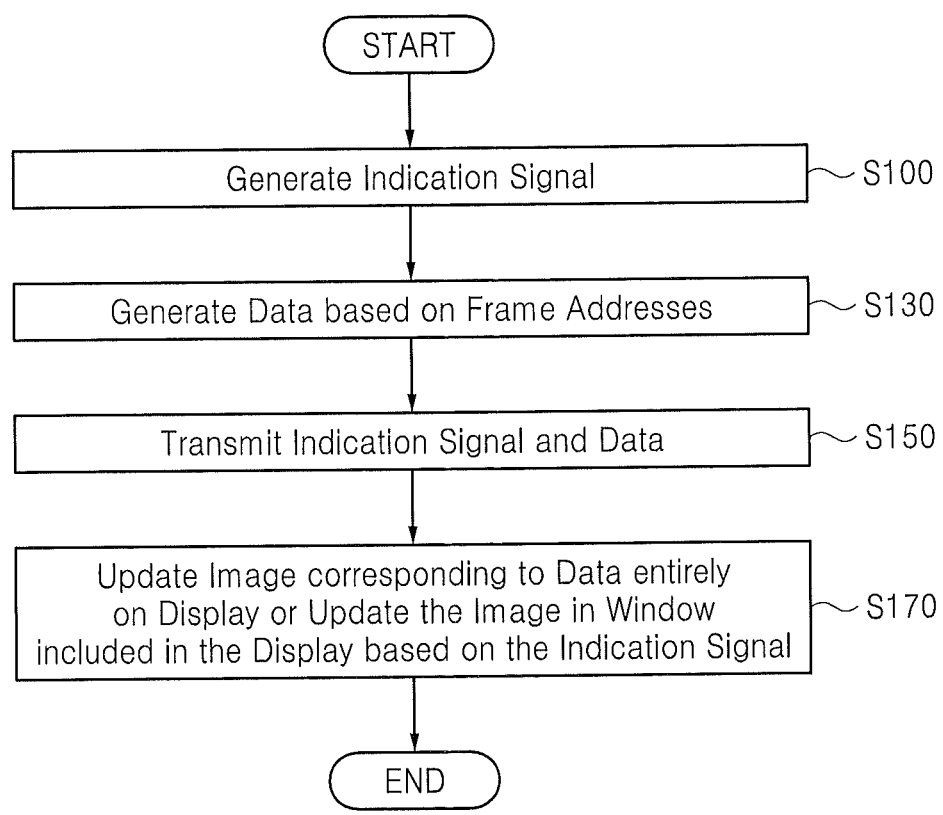
FIG. 11 is a flowchart for describing an operation method of the display systems illustrated in FIGS. 1, 9, and 10.

FIG. 11 is a flowchart for describing an operation method of the display system illustrated in FIG. 1, 9, or 10. Referring to FIGS. 1 to 11, the display processing device 100A, 100B, or 100C may generate an indication signal D_IDS indicating a data update for the whole frame FF or the partial frame PF according to an update control signal U_CTRL.

The display processing device 100A, 100B, or 100C may receive data DATA1 corresponding to a frame FF or PF which is determined to need a current update from the external memory 135 based on the frame addresses F_ADDS, and generate the processed data DATA4 (S130).

The display processing device 100A, 100B, or 100C may transmit the indication signal D_IDS during a back porch interval T1 of the vertical synchronization signal VSYNC, and transmit the processed data DATA4 after the back porch interval T1 of the vertical synchronization signal VSYNC (S150).

The display driver 300 may update an image corresponding to the data DATA4 entirely on the display 400 or update the image in the window included in the display 400 based on the indication signal D_IDS (S170). The display driver 300 may update an image corresponding to the data DATA4 of the whole frame FF or the partial frame PF on the display 400 based on the indication signal D_IDS indicating a data update for the whole frame FF or the partial frame PF.

Figure 12:
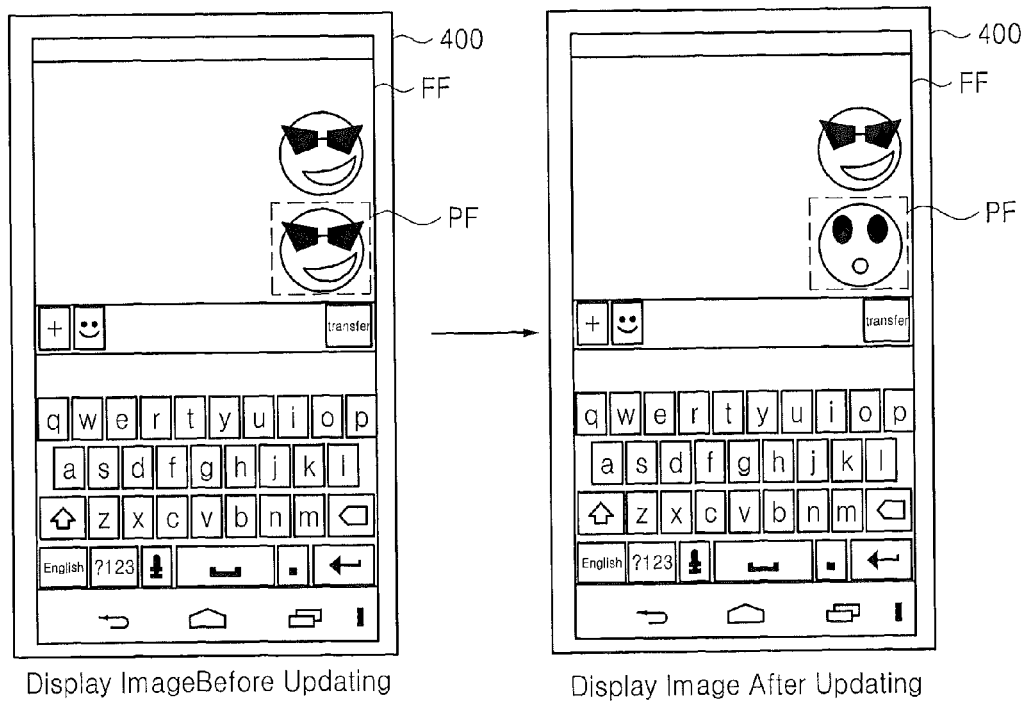
FIG. 12 is a display image displayed through the operation method of the display systems illustrated in FIGS. 1, 9, and 10.

FIG. 12 is a display image displayed through the operation method of the display system illustrated in FIGS. 1, 9, and 10. In FIG. 12, only the partial frame PF of a display image displayed on the display 400 is updated.

A display processing device 200A, 200B, or 200C may determine whether to update a partial frame PF of a display image displayed on the display 400, generate an indication signal D_IDS indicating a data update for the partial frame PF, read and process data DATA1 only corresponding to the partial frame PF from the external memory 135, and transmit the generated indication signal D_IDS and the processed data DATA4 to the display driver 300.

The display driver 300 may update an image corresponding to the processed data DATA4 in the window included in the display 400, e.g., a region where the partial frame PF is displayed, based on the indication signal D_IDS.

Figure 13:
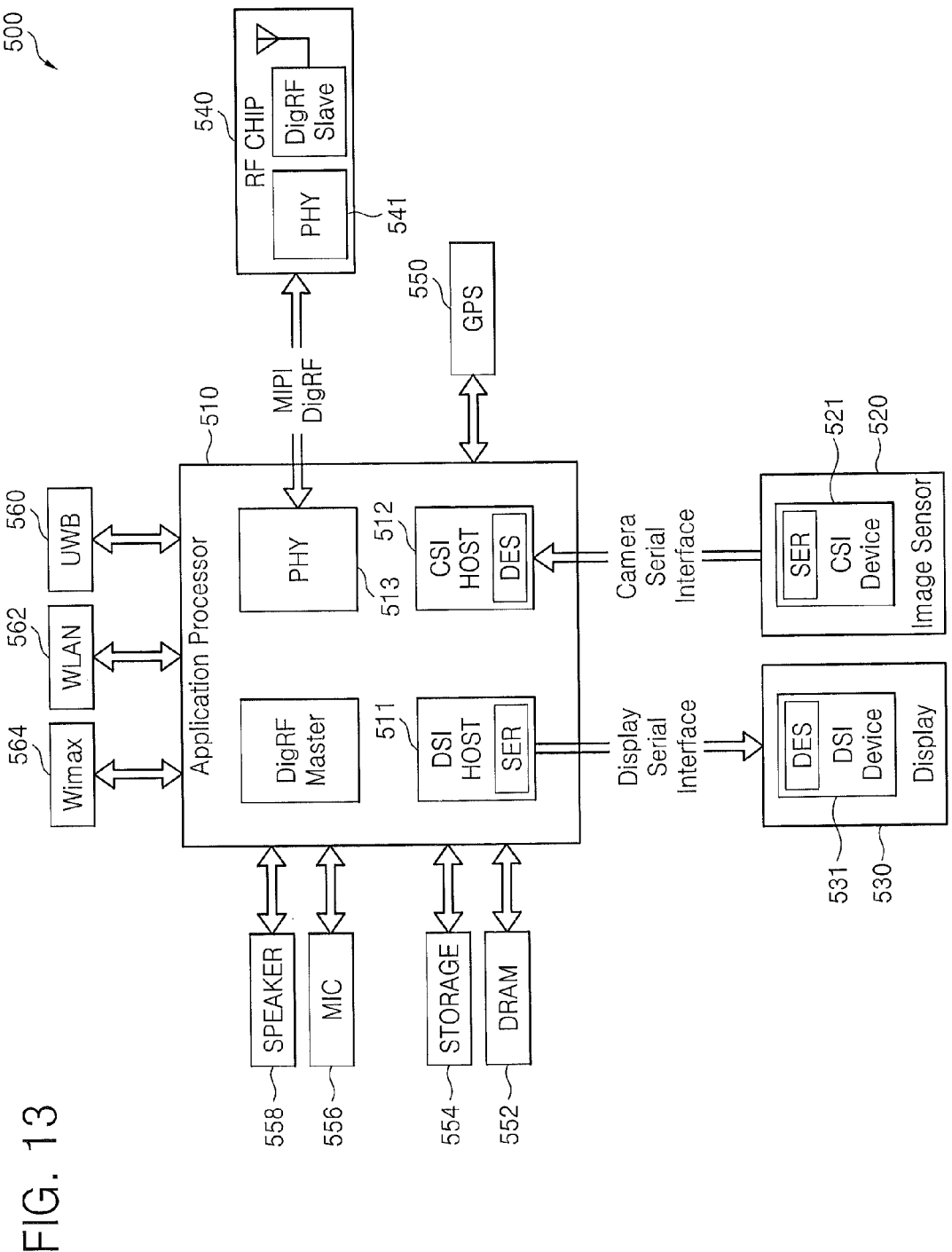
FIG. 13 is a block diagram of a display system according to still another example embodiment of the present inventive concept.

FIG. 13 is a block diagram of a display system according to still another example embodiment of the present inventive concept. A display system 500 of FIG. 13 may be embodied in a device which may use or support a mobile industry processor interface (MIPI), e.g., a mobile phone, a smart phone, or a tablet personal computer (PC).

The display system 500 includes an application processor 510, an image sensor 520, and a display 530. The application processor 510 may include the display controller 200A, 200B, or 200C illustrated in FIG. 1, 9, or 10.

A camera serial interface (CSI) host 512 embodied in the application processor 510 may perform a serial communication with a CSI device 521 of the image sensor 520 through the camera serial interface (CSI). According to an example embodiment, in the CSI host 512, a de-serializer DES may be embodied, and a serializer (SER) may be embodied in the CSI device 521.

A display serial interface (DSI) host 511 embodied in the application processor 510 may perform a serial communication with a DSI device 531 of the display 530 through a display serial interface. According to an example embodiment, a serializer SER may be embodied in the DSI host 511 and a de-serializer (DES) may be embodied in the DSI device 531.

The display system 500 may further include a RF chip 540 which may communicate with the application processor 510. A PHY 513 of the application processor 510 and a PHY 541 of the RF chip 540 may transmit or receive data to/from each other according to MIPI DigRF.

The display system 500 may further include a GPS 550 receiver, a volatile memory 552 such as a dynamic random access memory (DRAM), a data storage device 554 including a non-volatile memory like a NAND flash memory, a MIC 556, and/or a speaker 558. In addition, the application processor 510 may communicate with an external device using at least one communication protocol or communication standard, e.g., ultra-wideband (UWB) 560, Wireless LAN (WLAN) 562, Worldwide Interoperability for Microwave Access (WiMAX) 564, or Long Term Evolution (LTE™).

According to an example embodiment, the DSI host 511 may perform a function of the display controller 200A, 200B, or 200C in FIG. 1, 9, or 10.

A system on chip, a system including the same, and an operation method thereof according to an example embodiment of the present inventive concept generate and output an indication signal indicating a data update for a whole frame or a partial frame, thereby controlling so that a display driver may update an image corresponding to data of the whole frame or the partial frame based on the generated indication signal. Here, the device and the method transmits data only corresponding to the partial frame to the display driver based on the indication signal when data for the partial frame is updated, so that the device and the method may prevent waste of bandwidth of data.

Accordingly, the device and the method transmit the data only corresponding to the partial frame, thereby reducing a power consumed when transmitting the data.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An operation method of a display system comprising:
   detecting a first update region where a display image is to be updated;
   determining a first determination to update a partial frame included in a whole frame on a display based on the first update region being completely contained within a predefined partial frame region, wherein the predefined partial frame region is less than a whole frame region;
   receiving a first indication signal indicating a first data update and corresponding to the first determination to update the partial frame included in the whole frame;
   receiving first data;
   updating the partial frame on the display with an image corresponding to the first data based on the first indication signal corresponding to the first determination to update the partial frame;
   detecting a second update region where the display image is to be updated;
   determining a second determination to update the whole frame based on at least a portion of the second update region being outside of the predefined partial frame region;
   receiving a second indication signal indicating a second data update and corresponding to the second determination to update the whole frame;
   receiving second data; and
   updating the whole frame on the display with an image corresponding to the second data based on the second indication signal corresponding to the second determination to update the whole frame.

2. The operation method of claim 1, wherein the first and second indication signals are included in header portions of data packets that also include the respective data.

3. The operation method of claim 1, wherein the first and second indication signals are transmitted in back porch intervals of respective first and second vertical synchronization signals.

4. The operation method of claim 3, wherein the first data is transmitted in a first time portion between the back porch interval and a front porch interval of the first vertical synchronization signal and wherein data is not transmitted in a second time portion between the back porch interval and the front porch interval of the first vertical synchronization signal.

5. The operation method of claim 1, wherein the first and second indication signals and the first and second data are suitable for an RGB interface.

6. A system on chip (SoC) comprising:
   an update detecting circuit configured to generate a first update control signal corresponding to a first determination to update a partial frame included in a whole frame based on a first update region being completely contained within a predefined partial frame region and configured to generate a second update control signal corresponding to a second determination to update the whole frame based on at least a portion of a second update region being outside of the predefined partial frame region; and
   an update control circuit configured to generate a first indication signal corresponding to the first update control signal and configured to generate a second indication signal corresponding to the second update control signal.

7. The system on chip (SoC) of claim 6, wherein the update control circuit comprises:
   a special function register configured to set a plurality of addresses defining the partial frame; and
   a control circuit configured to generate the first indication signal corresponding to the first update control signal and the plurality of addresses defining the partial frame.

8. The system on chip (SoC) of claim 7, wherein the update control circuit further includes an encoder configured to encode the first and second indication signals.

9. The system on chip (SoC) of claim 6, wherein the first and second indication signals are included in header portions of data packets.

10. The system on chip (SoC) of claim 6, further comprising:
    an encoder configured to generate first and second encoded indication signals by encoding the first and second indication signals, respectively; and
    a transmission interface configured to transmit the encoded first and second indication signals during back porch intervals of respective first and second vertical synchronization signals.

11. The system on chip (SoC) of claim 10, further comprising a dynamic memory access (DMA) controller configured to read data corresponding to only the partial frame based on the first determination to update the partial frame,
    wherein the transmission interface is further configured to transmit the data in a first time portion between the back porch interval and a front porch interval of the first vertical synchronization signal and wherein data is not transmitted in a second time portion between the back porch interval and the front porch interval of the first vertical synchronization signal.

12. The system on chip (SoC) of claim 10, wherein the transmission interface is an RGB interface.

13. An operation method of a display system comprising:
    detecting a first update region where a display image is to be updated;
    determining a first determination to update a partial frame included in a whole frame based on the first update region being completely contained within a predefined partial frame region, wherein the predefined partial frame region is less than a whole frame region;
    transmitting a first display data relating only to the predefined partial frame region based upon the first determination to update the partial frame;
    updating a display image corresponding to the first display data;
    detecting a second update region where a display image is to be updated;
    determining a second determination to update the whole frame based on at least a portion of the second update region being outside the predefined partial frame region;
    transmitting a second display data relating to the whole frame region based upon the second determination to update the whole frame; and
    updating the display image corresponding to the second display data.

14. The operation method of claim 13, further comprising transmitting a first indication signal which indicates the predefined partial frame region corresponding to the first display data.

15. The operation method of claim 14, further comprising:
    receiving the first display data and first indication signal at a display driver; and updating a video memory within the display driver based upon the first display data and first indication signal.

16. The operation method of claim 13, wherein the display image corresponding to a region including all of the whole frame region outside of the predefined partial frame region remains unchanged when updating the display image corresponding to the first display data relating only to the predefined partial frame region.

\* \* \* \* \*